Patented June 24, 1952

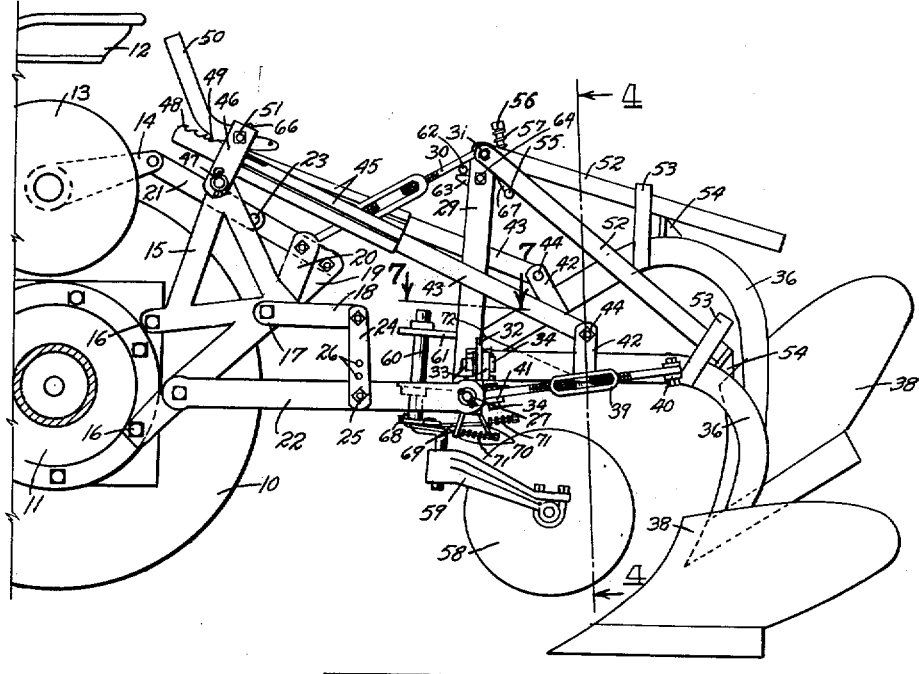
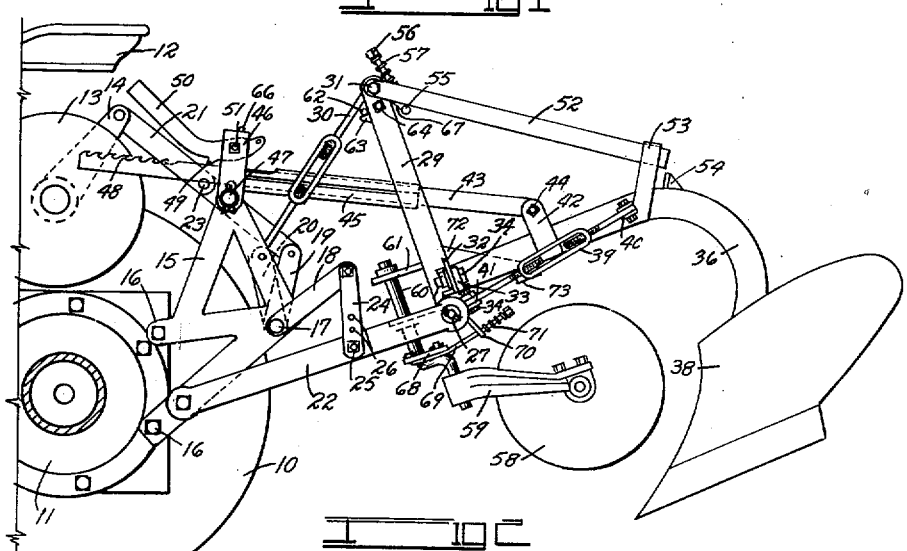
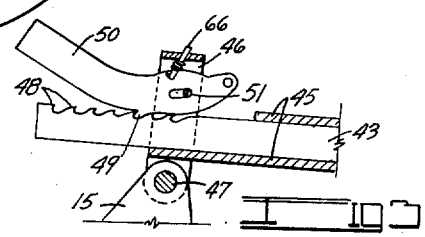
INVENTORS
ORVILLE S. HARBISON
BY GEORGE L. PAINE
ATTORNEY

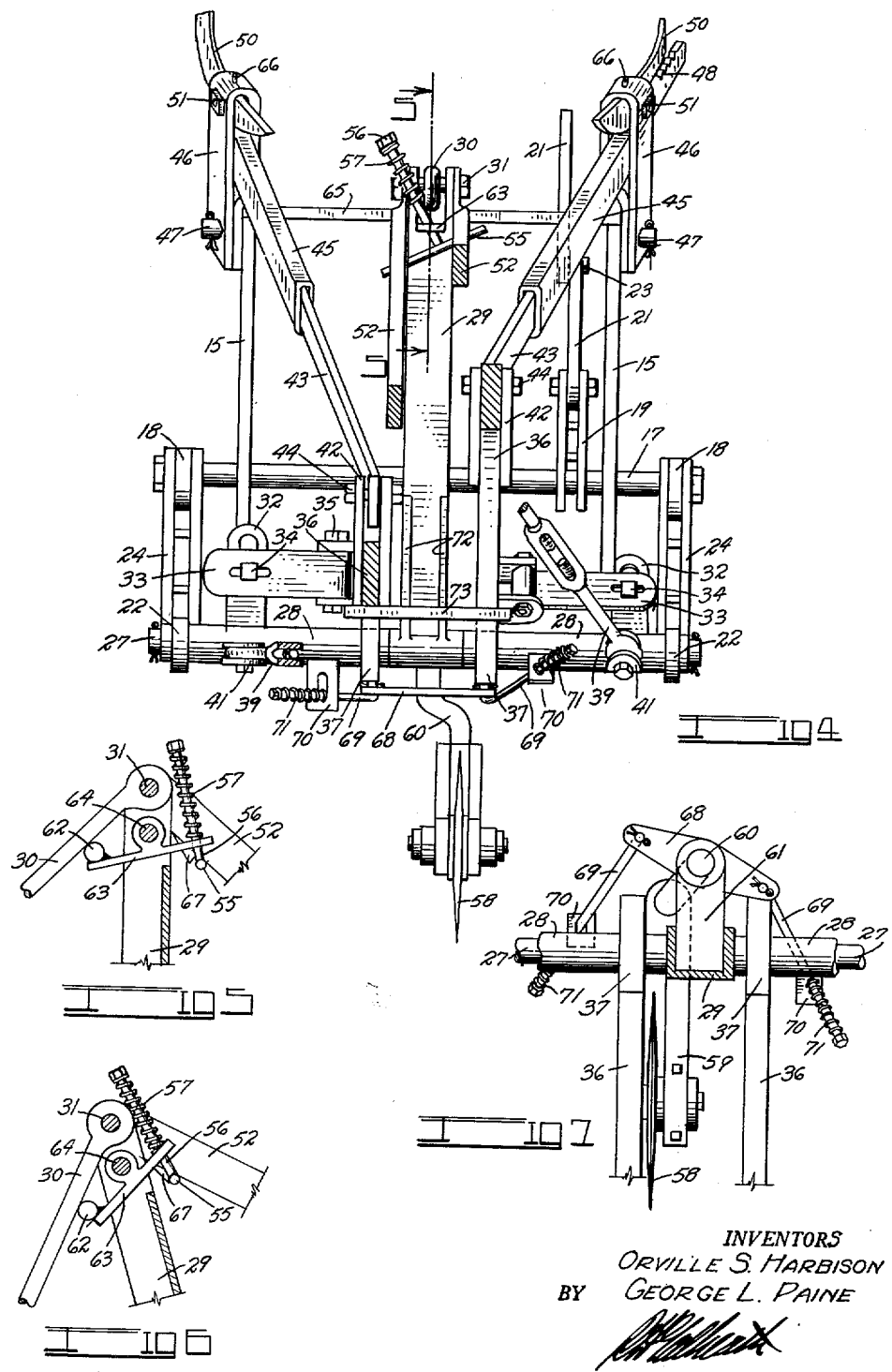

2,601,609

UNITED STATES PATENT OFFICE 2,601,609

TWO-WAY PLOW ATTACHMENT FOR TRACTORS

Orville S. Harbison and George L. Paine, Loveland, Colo.

Application June 17, 1949, Serial No. 99,736

4 Claims. (Cl. 97—29)

This invention relates to a two-way plow attachment for a tractor, and has for its principal object the provision of a simple, light-weight, sturdy, and highly efficient two-way plow attachment which can be quickly and easily attached to any conventional tractor and which can be easily operated by the tractor driver to place either desired plow in plowing position or to elevate both plows for turning and traveling without it being necessary for the driver to leave his seat.

Another object is to provide a device of this character in which the plows can be easily and accurately adjusted as to position, depth, alignment and level and to provide automatic means which will come into position as either plow is lowered to absorb the upthrust of the plow and hold it down in the furrow.

A further object is to provide a single rolling colter which will automatically move to the land side of either plow in use.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of the improved two-way plow attachment in place on a typical tractor, illustrating the right-hand plow raised and the left-hand plow in plowing position;

Fig. 2 is a similar view illustrating both plows raised;

Fig. 3 is a detail view of a latch mechanism employed in the invention;

Fig. 4 is an enlarged cross-section taken on the line 4—4, Fig. 1, with the tractor omitted;

Fig. 5 is a detail vertical section taken on the line 5—5, Fig. 4;

Fig. 6 is a similar section illustrating the positions of the various elements when both plows are raised; and Fig. 7 is an enlarged detail horizontal section taken on the line 7—7, Fig. 1.

In the drawings, the rear wheels of a conventional farm tractor are illustrated at 10, the differential housing at 11, the driver's seat 12, the mechanical implement lift mechanism at 13, and the implement lift lever at 14. While the tractor illustrated has a mechanical lift the invention is equally applicable to a hydraulic or manual lift mechanism.

An implement frame 15 is attached to each side of the differential housing 11 by means of suitable attachment bolts 16. The frames 15 are joined at the top by means of a cross brace 65 and rotatably support a horizontal lift shaft 17, to the extremities of which two lift levers 18 are fixedly secured. An actuating lever 19 is fixedly secured to the shaft 17 intermediate the frames 15, and a ram bar lever 20 is fixedly secured at the middle of the shaft 17.

A tension link 21 extends from the lever 19 to the implement lift lever 14 by means of which the shaft 17 is caused to rotate in unison with the implement lift lever 14. The link 21 is formed in two sections hinged together upon a hinge pin 23 so that it can exert only a pulling or tension effort.

A draw bar link 22 is hinged to each frame 15 and extends rearwardly therefrom. Each of the draw bar links 22 is suspended from one of the lift levers 18 by means of an adjustable hanger 24. The links 22 and the hangers 24 are attached to each other by means of removable bolts 25, which can be placed in any desired ones of a series of bolt holes 26 to support the rear extremities at any desired height. The rear extremities of the draw bar links 22 carry a draw bar shaft 27. A swinging post 29 is welded or otherwise secured on the mid-portion of the shaft 27 and arises therefrom. The upper extremity of the post 29 is connected to the upper extremity of the ram bar lever 20 by means of an adjustable-length ram bar 30 hingedly mounted at its upper extremity on a cross pin 31 extending through the post.

A rotatable sleeve 28 surrounds the shaft 27 at each side of the post 29. A lever arm 32 is welded or otherwise secured to each of the sleeves 28. The lever arms 32 extend upwardly from the sleeves, and each is slotted and lies against a slotted plate 33. An adjustment bolt 34 passes through the slotted openings of the members 32 and 33 by means of which each plate 33 is clamped to one of the arms 32.

Each of the plates 33 is hinged upon a hinge pin 35 upon one of two plow beams 36. The pins 35 extend vertically of the beams so that one of the plates extends laterally from each of the plow beams 36. Each plow beam carries at its forward extremity a plow block 37, which surrounds one of the sleeves 28. The blocks 37 are relatively loosely mounted on the sleeves 28 so that they may move freely therealong or tilt thereabout.

The plow beams extend rearwardly and downwardly to any suitable right and left-hand plow bottoms 38. The beams are laterally braced by means of turnbuckles 39. The turnbuckles 39 extend between ears 40 on the plow beams 36 and similar ears 41 welded or otherwise secured on the extremities of the sleeves 28.

A saddle member 42 arises from each plow beam, and a slide bar 43 is mounted in each saddle member 42 on a suitable hinge bolt 44. The slide bars 43 extend upwardly and forwardly through slide sleeves 45. The forward extremity of each slide sleeve is supported in an inverted, U-shaped yoke member 46 which is mounted at its lower extremity upon a hinge stud 47 extending from one of the side frames 15.

Each of the slide bars 43 is notched along its upper edge adjacent its rearward extremity, as shown at 48. The notches are positioned to be engaged by a latch tooth 49 formed on a latch lever 50. Each latch lever 50 is mounted on a pivot bolt 51 extending through one of the yoke members 46. Thus, when the slide bars 43 move rearwardly in their sleeves 45, the tooth 49 will engage one of the notches 48 and stop rearward movement.

The tooth can be released from the notch to allow rearward movement by simply lifting the forward extremity of the lever 50. The levers are positioned within convenient reach at each side of the driver's seat 12. A spring-actuated holding pin 66 is positioned between the top of each yoke member 46 and the adjacent lever above the pivot bolts 51 so as to swing back and forth past the dead center position to hold the levers in either the engaged or disengaged positions.

A thrust bar 52 is mounted at each side of the upper extremity of the post 29 upon the extremities of the pin 31. Each thrust bar 52 extends rearwardly over one of the plow beams 36 and through an inverted, U-shaped guide 53 thereon. The length of each thrust bar 52 is such that each will swing ahead of a lug 54 on the adjacent plow beam when the latter is in the plowing position, as shown by the left-hand plow 38 of Fig. 1.

The thrust bars 52 are urged upwardly by means of a T-head 55 on a pull rod 56 which is constantly urged upwardly by means of a compression spring 57. The spring rests on a tilting plate 63 pivotally mounted on a pivot bolt 64 and provided with a cross head 62 which rests against the ram bar 30. The T-head 55 rests at its extremities against lugs 67 beneath the thrust bars 52 so as to constantly exert an upward action on the latter.

A rolling colter 58 is mounted intermediate the two plows 38 upon a caster bracket 59. The caster bracket 59 is swingingly mounted on the lower extremity of an offset, rotatable, vertical king pin 60 journalled in pin brackets 61 extending rearwardly from the post 29.

A cross arm 68 is secured on the pin 60 below its supporting brackets 61 so as to extend oppositely outward therefrom. Each extremity of the cross arm 68 is connected by means of a pull rod 69 with an ear 70 on one of the sleeves 28. A compression spring 71 is positioned between the extremity of each rod 69 and the adjacent ear 70 so as to constantly exert a pulling action on the extremity of the cross arm 68.

A rigid bracket 72 extends rearwardly from the lower portion of the post 29 to support a cross shelf bar 73 which extends oppositely outward from the bracket 72 beneath both plow beams 36.

Operation

Both plows may be elevated by actuating the implement lift lever 14 toward the position of Fig. 2. This causes the link 21 to rotate the shaft 17. Rotation of the latter shaft lifts the draw bar shaft 27 through the medium of the levers 18 and hangers 24. It also swings the post 29 forwardly through the medium of the lever 20 and the ram bar 30. As the post swings forwardly the rear extremity of the bracket 72 swings upwardly to cause the cross shelf bar 73 to engage and lift the plow beams 36 and the plow bottoms 38 to the position of Fig. 2.

As the post swings forwardly from the position of Fig. 5 to the position of Fig. 6 the angle between the ram bar 30 and the post decreases. This causes the tilting plate to swing upwardly against the spring 57, as shown in Fig. 6, to cause the T-head 55 on the pull rod 56 to act against the lugs 67 to lift the thrust bars 52 from engagement with the lugs 54.

As the plow beams elevate, the slide bars 43 slide forwardly through their sleeves 45, causing the teeth 49 to ratchet over the notches 48 until the plows reach the position of Fig. 2.

The implement lift lever 14 may now be reversed slightly, allowing the tooth 49 of each ratchet lever 50 to engage the first notch 48 of each slide bar 52 so as to hold both plows elevated during turning and transporting operations.

Let us assume that the tractor is now turned and aligned with the furrow and that it is desired to turn the earth toward the left, with the land side of the plow toward the right. The operator pulls the left-hand ratchet lever 50 upward, where it will be supported by the holding pin 66, and actuates his implement lift lever 14 to lower the draw bar shaft 27 and the plows. This allows the left-hand plow 34 to move downwardly, the right-hand plow being supported by its latch 50. As the post 29 resumes its vertical position the thrust bar 52 of the right-hand plow will slide rearwardly over its lug 54 and when the left-hand plow has reached its plowing position its thrust bar will drop in front of its lug 54 to lock the plow in the furrow. The compression in the spring 57 will be released as the post resumes its vertical position so that it will be unable to support the thrust bars 52 and the pull rod 56 will tilt as shown in Fig. 4, to allow the left bar 52 to engage its lug 54.

The sleeve 28 upon which the right-hand plow is mounted will be rotated to swing its ear 70 rearwardly and the sleeve 28 of the left-hand plow will be rotated forwardly to increase the compression in the right-hand spring 71 and decrease the tension in the left-hand spring 71. This causes the pull rods to act on the cross arm 68 to rotate the offset in the king pin 60 to the left to place the colter 58 ahead of the operating left-hand plow.

When the end of the furrow is reached, the operator operates the implement lift lever to lift both plows to the position of Fig. 2, then turns the tractor and again aligns it with the furrow. He then lowers the latch lever 50 of the left-hand plow and raises the latch lever 50 of the right-hand plow. This causes the left-hand plow to remain supported and allows the right-hand plow to descend to the plowing position, where it is locked by its thrust bar 52 and lug 54. The sleeves 28 are automatically oppositely rotated to swing the king pin to place the colter ahead of the working plow.

The plows are adjusted for longitudinal alignment with the furrow line by adjusting the turnbuckles 39, which swings the rearward extremities of the plow beams inwardly and outwardly. The plow bottoms are leveled by adjusting the adjustable ram bar 30 to swing the post 29 forwardly or backwardly. The upthrust of the plows is absorbed through the thrust bars 52 and the ram bar 30.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A plow attachment for tractors comprising: a frame; means for securing said frame to said tractor; a pair of draw bar links extending rearwardly from said frame in parallel relation; a draw bar shaft extending transversally between the rearward extremities of said draw bar links; a pair of plow beams rotatably mounted at their forward extremities on said shaft and extending rearwardly therefrom; a post extending upwardly from the mid-portion of said shaft between said plow beams; a horizontal lift shaft transversally mounted in said frame over said draw bar links; lift levers projecting from said shaft; hangers extending from said lift levers to said draw bar links for lifting the latter; a ram bar lever extending from said lift shaft; a ram bar extending from said ram bar lever to said post; a shelf projecting rearwardly from said post below said plow beams; and means for rotating said lift shaft to lift said lift levers and swing said post forwardly to cause said shelf to lift said plow beams.

2. A plow attachment for tractors comprising: a frame; means for securing said frame to said tractor; a pair of draw bar links extending rearwardly from said frame in parallel relation; a draw bar shaft extending transversally between the rearward extremities of said draw bar links; a pair of plow beams rotatably mounted at their forward extremities on said shaft and extending rearwardly therefrom; a post extending upwardly from the mid-portion of said shaft between said plow beams; a horizontal lift shaft transversally mounted in said frame over said draw bar links; lift levers projecting from said shaft; hangers extending from said lift levers to said draw bar links for lifting the latter; a ram bar lever extending from said lift shaft; a ram bar extending from said ram bar lever to said post; a shelf projecting rearwardly from said post below said plow beams; means for rotating said lift shaft to lift said lift levers and swing said post forwardly to cause said shelf to lift said plow beams; a slide bar extending forwardly from each plow beam and provided with ratchet notches; a slide mounted on said frame for receiving each slide bar; and a manually actuated latch member mounted on each slide for engaging the notches in said slide bar for holding either desired plow in the elevated position.

3. A plow attachment for tractors comprising: a frame; means for securing said frame to said tractor; a pair of draw bar links extending rearwardly from said frame in parallel relation; a draw bar shaft extending transversally between the rearward extremities of said draw bar links; a pair of plow beams rotatably mounted at their forward extremities on said shaft and extending rearwardly therefrom; a post extending upwardly from the mid-portion of said shaft between said plow beams; a horizontal lift shaft transversally mounted in said frame over said draw bar links; lift levers projecting from said shaft; hangers extending from said lift levers to said draw bar links for lifting the latter; a ram bar lever extending from said lift shaft; a ram bar extending from said ram bar lever to said post; a shelf projecting rearwardly from said post below said plow beams; means for rotating said lift shaft to lift said lift levers and swing said post forwardly to cause said shelf to lift said plow beams; thrust bars hingedly mounted adjacent the upper extremity of said post, there being one thrust bar extending rearwardly over each plow beam; and an abutment on each plow beam positioned to engage the extremity of a thrust bar when the beam is in the lowered position to absorb the upthrust of said plows.

4. A plow attachment for tractors comprising: a frame; means for securing said frame to said tractor; a pair of draw bar links extending rearwardly from said frame in parallel relation; a draw bar shaft extending transversally between the rearward extremities of said draw bar links; a pair of plow beams rotatably mounted at their forward extremities on said shaft and extending rearwardly therefrom; a post extending upwardly from the mid-portion of said shaft between said plow beams; a horizontal lift shaft transversally mounted in said frame over said draw bar links; lift levers projecting from said shaft; hangers extending from said lift levers to said draw bar links for lifting the latter; a ram bar lever extending from said lift shaft; a ram bar extending from said ram bar lever to said post; a shelf projecting rearwardly from said post below said plow beams; means for rotating said lift shaft to lift said lift levers and swing said post forwardly to cause said shelf to lift said plow beams; thrust bars hingedly mounted adjacent the upper extremity of said post, there being one thrust bar extending rearwardly over each plow beam; an abutment on each plow beam positioned to engage the extremity of a thrust bar when the beam is in the lowered position to absorb the upthrust of said plows; spring-actuated means tending to urge said thrust bars upwardly out of the path of said abutments; and means actuated in consequence of the swinging of said post for causing said spring-actuated means to elevate said thrust bars from said abutments.

ORVILLE S. HARBISON.
GEORGE L. PAINE.

REFERENCES CITED

The following references are of record in the file of this patent:

UNITED STATES PATENTS

| Number | Name | Date |
|---|---|---|
| 267,630 | Witt | Nov. 14, 1882 |
| 520,905 | Swickard | June 5, 1894 |
| 708,405 | Robinson | Sept. 2, 1902 |
| 941,252 | Hightower | Nov. 23, 1909 |
| 1,220,449 | Patterson | Mar. 27, 1917 |
| 1,303,427 | Wallace | May 13, 1919 |
| 1,318,036 | Wakefield | Oct. 7, 1919 |
| 2,401,837 | Mellen | June 11, 1946 |
| 2,457,163 | Lansing | Dec. 28, 1948 |
| 2,474,731 | Evans | June 28, 1949 |